United States Patent
Ishino et al.

(10) Patent No.: US 7,887,209 B2
(45) Date of Patent: Feb. 15, 2011

(54) LIGHT SOURCE DEVICE AND DISPLAY APPARATUS

(75) Inventors: Toshiki Ishino, Hiratsuka (JP); Toshiyuki Okuma, Chofu (JP); Takaaki Nakabayashi, Kawasaki (JP); Yoshihiro Saito, Hachioji (JP)

(73) Assignee: Canon Kabushiki Kaisha, Tokyo (JP)

( * ) Notice: Subject to any disclaimer, the term of this patent is extended or adjusted under 35 U.S.C. 154(b) by 826 days.

(21) Appl. No.: 11/740,330

(22) Filed: Apr. 26, 2007

(65) Prior Publication Data

US 2007/0253183 A1   Nov. 1, 2007

(30) Foreign Application Priority Data

Apr. 26, 2006   (JP)   ............... 2006-122530

(51) Int. Cl.
G09F 13/04   (2006.01)
G09F 13/08   (2006.01)

(52) U.S. Cl. ............... 362/97.3; 362/97.2; 362/247; 313/500

(58) Field of Classification Search ............... 362/29, 362/30, 97.2, 97.3, 247, 249.02, 800, 812; 313/500
See application file for complete search history.

(56) References Cited

U.S. PATENT DOCUMENTS

| | | | |
|---|---|---|---|
| 5,786,665 A | 7/1998 | Ohtsuki et al. | |
| 6,547,400 B1 * | 4/2003 | Yokoyama | 353/98 |
| 6,874,910 B2 * | 4/2005 | Sugimoto et al. | 362/800 |
| 7,281,816 B2 | 10/2007 | Suzuki | |
| 7,354,178 B2 * | 4/2008 | Han et al. | 362/800 |
| 7,510,314 B2 | 3/2009 | Arai et al. | |
| 2005/0195341 A1 | 9/2005 | Koganezawa et al. | |

FOREIGN PATENT DOCUMENTS

| | | |
|---|---|---|
| JP | 08-315621 A | 11/1996 |
| JP | 11-174988 | 7/1999 |
| JP | 2002-072901 | 3/2002 |
| JP | 2004-319458 A | 11/2004 |
| JP | 2005-235581 A | 9/2005 |
| JP | 2005-249942 | 9/2005 |
| JP | 2006-059606 A | 3/2006 |

* cited by examiner

*Primary Examiner*—Stephen F Husar
(74) *Attorney, Agent, or Firm*—Canon U.S.A., Inc. I.P. Division (57) ABSTRACT

A light source device includes at least one dot-like light source, a substrate where the dot-like light source is arranged, and a reflection member which is arrange to be in contact with a light-emitting surface of the dot-like light source and cover the light-emitting surface. The reflection member further includes an opening to pass therethrough a beam emitted from the dot-like light source.

9 Claims, 7 Drawing Sheets

FIG. 7

LIGHT SOURCE DEVICE AND DISPLAY APPARATUS

BACKGROUND OF THE INVENTION

1. Field of the Invention

The present invention relates to a light source device which illuminates a display element and a display apparatus in which the light source device is used and, more particularly, to a light source device used in a display apparatus which is mounted on the head of an observer and displays an image before the observer's eyes.

2. Description of the Related Art

In recent years, a head mounted video display apparatus has been developed which is mounted on the observer's head, enlarges an image displayed on a video display element such as a liquid crystal element, and displays the image in before the observer's eyes, so the observer can observe a large-screen image.

Figure 7:
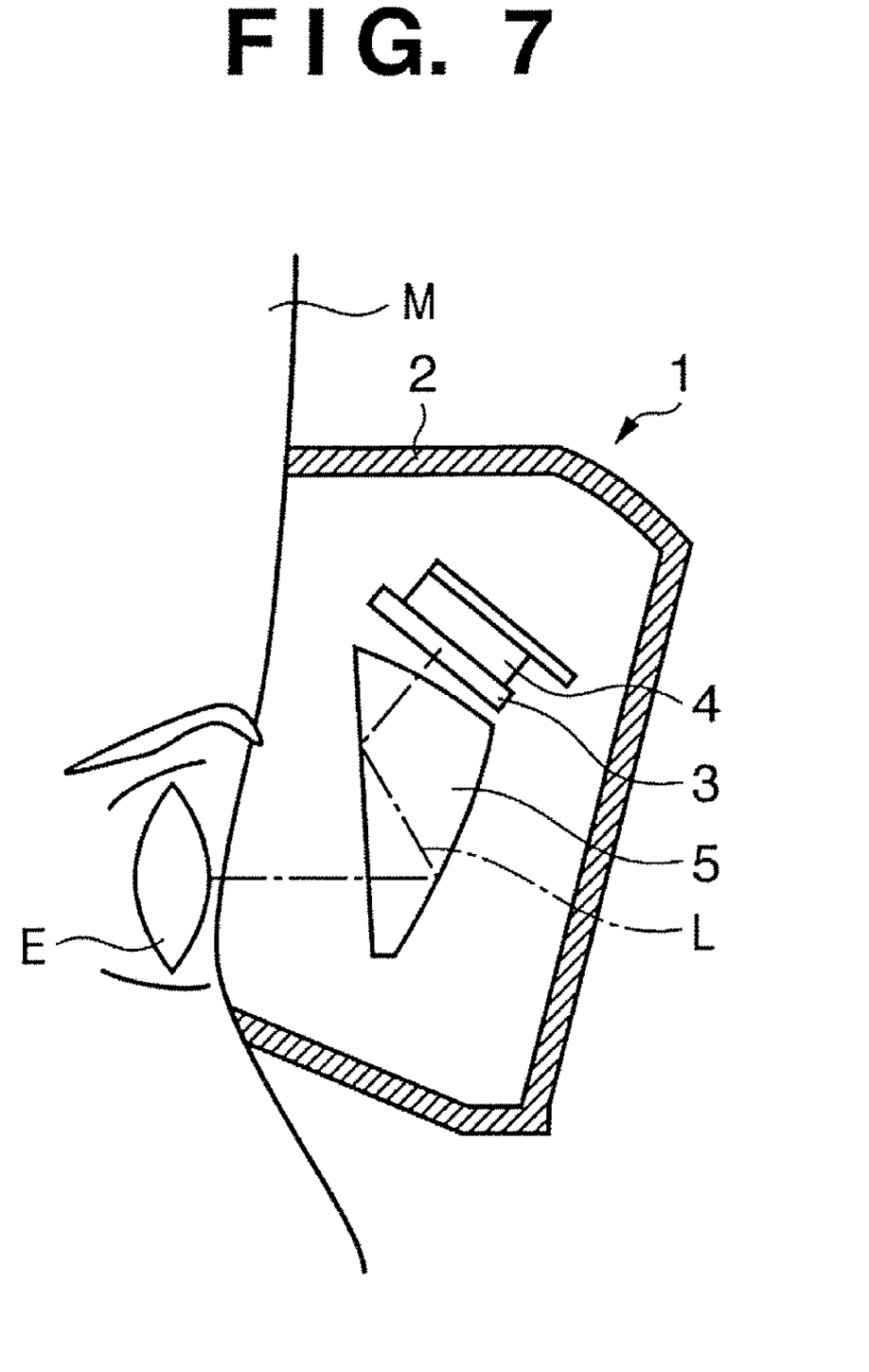
FIG. 7 is a view showing the arrangement of a conventional video display apparatus.

In a video display apparatus disclosed in Japanese Patent Laid-Open No. 11-174988, as shown in FIG. 7, a pair of right and left LCDs 3 serving as two-dimensional video display elements which display images respectively corresponding to the right and left eyes of the observer are arranged inside an outer frame 2 of an apparatus main body 1. A pair of backlights 4 which illuminate the LCDs 3 are arranged behind the respective LCDs 3. A pair of prisms 5 which enlarge the images from the LCDs 3 and guide the enlarged images to two eyes E are arranged under the LCDs 3. The images displayed on the LCDs 3 are guided before the two eyes E of an observer M through observation optical axes L of the prisms 5, enlarged while they pass through the two prisms 5, and projected as if they existed before the two eyes E.

The video display apparatus shown in FIG. 7 employs transmission type video display elements. Images displayed on the LCDs 3 serving as the video display elements are presented to the observer as illumination beams are transmitted through the video display elements.

Each of such transmission type video display elements usually uses a white cold cathode tube as an illumination light source. Usually, R, G, and B color filters are used to generate a color image. Employment of color filters, however, decreases the resolution of a displayed image to ⅓ that of the liquid crystal element itself.

To solve this problem, in recent years, a sequential scheme video display apparatus has been provided. The sequential type video display apparatus does not use color filters but illumination light sources which can emit R, G, and B light. The apparatus sequentially switches the emission colors and the images of the video display elements in accordance with the light emission timings of the respective colors, thereby displaying images.

According to the sequential scheme, the respective illumination light sources of the R, G, and B colors are turned on at a frequency of 180 Hz, which is three times the usual image display frequency of 60 Hz. The video display elements display images in accordance with the light-on timings of the respective colors. This arrangement allows the observer to observe a high-resolution full-color image.

As the illumination light sources employed for sequential scheme illumination, color LEDs having high color reproducibility and high response speed are often used.

According to an example of the arrangement of an illumination device using LEDs, as disclosed in Japanese Patent Laid-Open Nos. 2002-72901 and 2005-249942 (corresponding US Publication No. 2005/0195341A1), dot-like light sources (e.g., LED light-emitting elements) are arranged on a substrate two-dimensionally, and an optical sheet such as a diffusion plate is arranged on a surface that opposes the LED light-emitting elements. This suppresses nonuniform luminance.

A reflection member is arranged on a surface where the LED light-emitting elements are mounted. The reflection member reflects illumination beams to increase the beam utilization efficiency.

In the arrangement disclosed in Japanese Patent Laid-Open No. 2002-72901, the diameter of each opening of the reflection member is larger than that of each dot-like light source. Accordingly, some beams may undesirably leak to the lower side, or the member that forms the dot-like light sources may undesirably absorb the reflected light. Hence, in this arrangement, the reflected light is not utilized effectively.

In the arrangement disclosed in Japanese Patent Laid-Open No. 2005-249942, as the reflection member is arranged under the LED array, the LED array undesirably absorbs the reflected light in a similar fashion. Hence, in this arrangement, the reflected light is not utilized effectively.

SUMMARY OF THE INVENTION

The present invention has been made to solve the above problems, and has as its object to provide a light source device and display apparatus which can utilize reflected illumination light effectively.

According to one aspect of the present invention, a light source device to illuminate a display element, comprising: at least one dot-like light source;
a substrate where the dot-like light source is arranged; and
a reflection member which is arranged to be in contact with a light-emitting surface of the dot-like light source and cover the light-emitting surface,
the reflection member further including an opening to pass therethrough a beam emitted from the dot-like light source.

In a preferred embodiment, a taper surface is formed to surround the light-emitting surface of the dot-like light source, and
the opening is larger than an end portion of the taper surface.

In a preferred embodiment, a taper surface is formed to surround the light-emitting surface of the dot-like light source, and
the opening is smaller than a size of an end face of a housing of the dot-like light source.

In a preferred embodiment, the reflection member comprises one of a member made of a metal and a member obtained by attaching a reflection plate to a metal.

In a preferred embodiment, the housing of the dot-like light source includes a side surface that surrounds the substrate where the dot-like light source is arranged, and
the reflection member is arranged to be in contact with the side surface.

According to another aspect of the present invention, a display apparatus which processes an input signal and displays an image to an observer, comprising:
display means;
at least one dot-like light source to illuminate the image displayed on the display means;
a substrate where the dot-like light source is arranged; and
reflecting means which is arranged to be in contact with a light-emitting surface of the dot-like light source and cover the light-emitting surface,
the reflection means further including an opening to pass therethrough a beam emitted from the dot-like light source.

Further features of the present invention will be apparent from the following description of exemplary embodiments with reference to the attached drawings.

DESCRIPTION OF THE EMBODIMENTS

Preferred embodiments of the present invention will now be described in detail with reference to the drawings. It should be noted that the relative arrangement of the components, the numerical expressions and numerical values set forth in these embodiments do not limit the scope of the present invention unless it is specifically stated otherwise.

First Embodiment

The first embodiment of the present invention will be described in detail with reference to FIGS. 1 to 5B.

Figure 1:
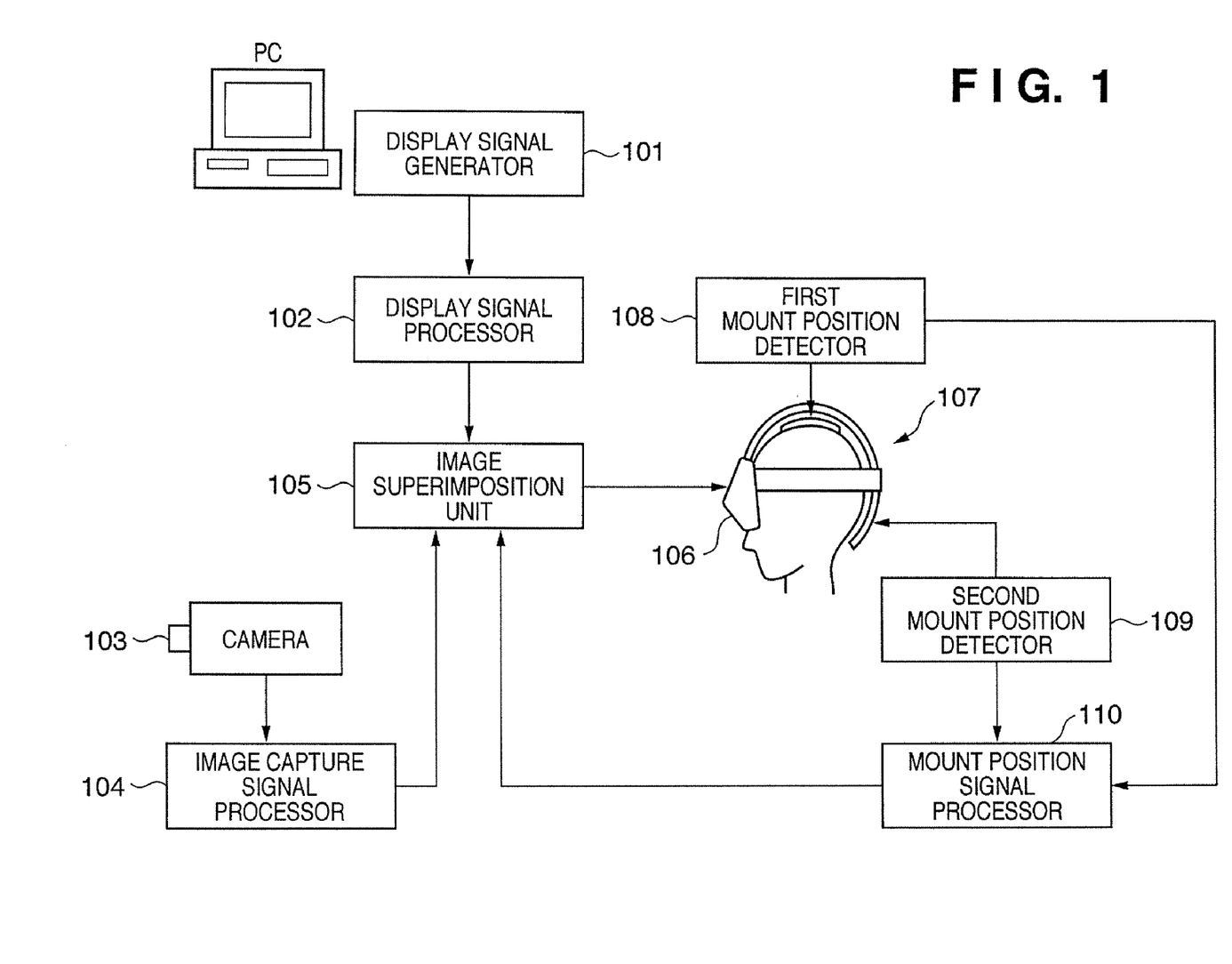
FIG. 1 is a view showing the arrangement of a video display apparatus according to the first embodiment of the present invention.

FIG. 1 is a view showing the arrangement of a video display apparatus according to the first embodiment of the present invention.

Reference numeral 101 denotes a display signal (display image) generator to generate a video signal of a CG image or the like which is to be displayed on a video display unit. Usually, the display signal generator 101 comprises a computer such as a PC. A display signal generated by the display signal generator 101 is transmitted to a display signal processor 102, and it is processed in a signal form that can be transmitted to an HMD (Head Mounted Display) 107 in the display signal processor 102.

Reference numeral 103 denotes an image capture camera to capture the image of the external world. The image capture camera 103 comprises image sensing devices such as CCDs and a lens. Although FIG. 1 shows the image capture camera 103 as a member separate from the main body of the HMD 107, actually, the main body of the HMD 107 incorporates the image capture camera 103.

The image capture camera 103 has an image capturing direction almost coinciding with the eye direction of the observer, to capture the image on the observer's eyes. The image captured by the image capture camera 103 is transmitted to an image capture signal processor 104. The image capture signal processor 104 processes the captured image to have a form that can be displayed on a video display unit 106 in the main body of the HMD 107. An image superimposition unit 105 superimposes the image generated by the display signal generator 101 on the image captured by the image capture camera 103. The display elements in the main body of the HMD 107 display the superimposition image.

The observer wears a first mount position detector 108 and second mount position detector 109 to detect his position (the mount position of the HMD) and orientation. Detection signals from the detectors 108 and 109 are transmitted to a mount position signal processor 110.

The mount position signal processor 110 generates a control signal concerning the image superimposing process of the image superimposition unit 105 from the received detection signals and outputs the control signal to the image superimposition unit 105. The control signal enables the image superimposition unit 105 to superimpose the image generated by the display signal generator 101 on the image captured by the image capture camera 103 on one coordinate system.

The arrangement of the video display unit 106 of the HMD 107 will be described with reference to FIG. 2.

Figure 2:
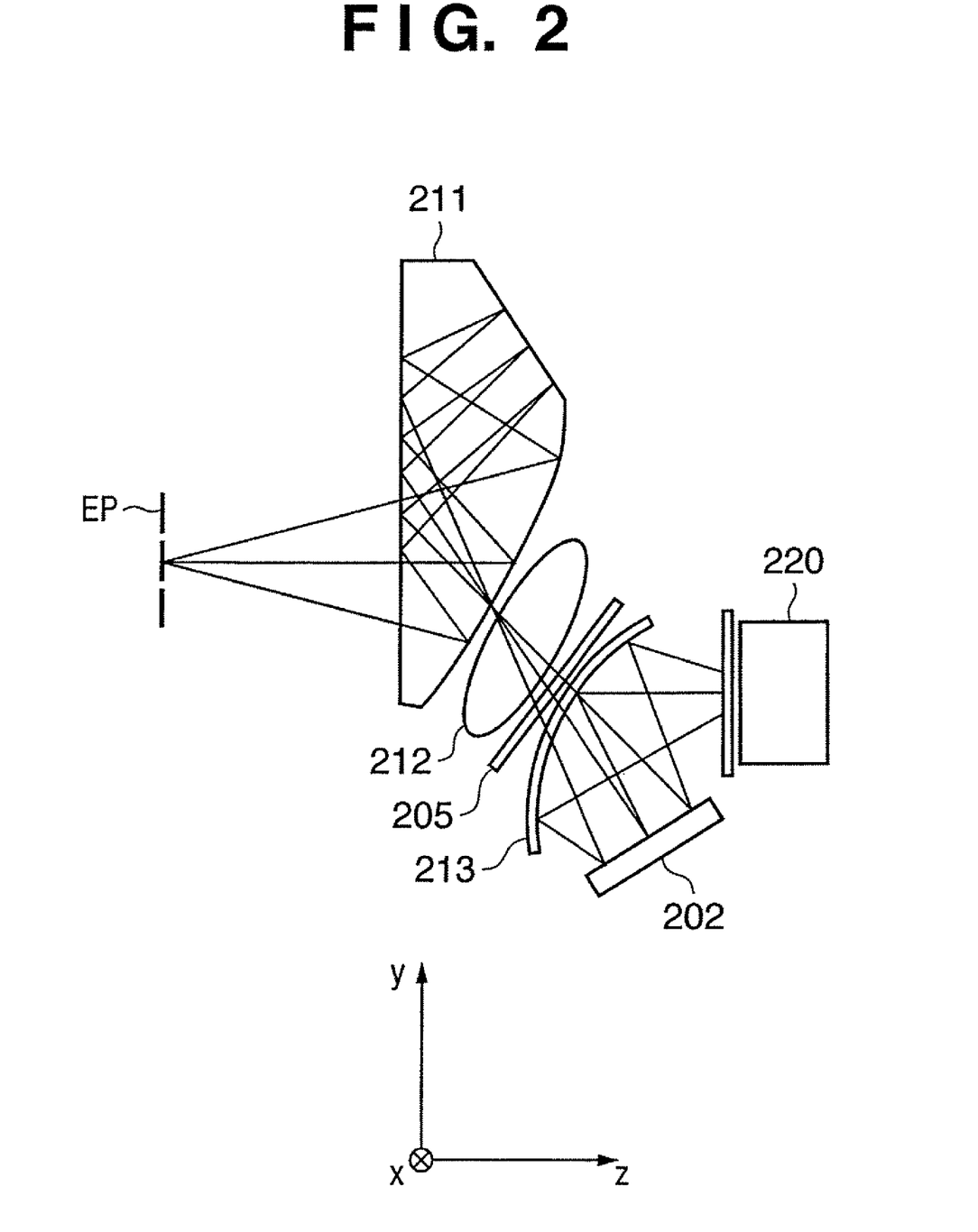
FIG. 2 is a sectional view of a video display unit in an HMD (Head Mounted Display) according to the first embodiment of the present invention, which is taken along a section parallel to the optical axis.

FIG. 2 is a sectional view of the video display unit 106 of the HMD 107 according to the first embodiment of the present invention, which is taken along a section parallel to the optical axis.

Reference numeral 202 denotes a reflection type liquid crystal panel which reflects an incident linear polarized beam by changing the polarizing direction to display a two-dimensional image. Reference numeral 220 denotes a light source unit serving as a light source device which illuminates the liquid crystal panel 202 serving as a video display element. A half mirror 213 reflects a beam emerging from the light source unit 220 to enter the liquid crystal panel 202. The liquid crystal panel 202 changes the polarizing direction of the incident light in accordance with the displayed video information to reflect the incident light. The reflected beam is transmitted through the half mirror 213 again and then through a polarizing plate 205 to form an observable image. A lens 212 and prism 211 enlarge the beam transmitted through the polarizing plate 205 to be projected to eyeballs EP of the observer.

The sectional view of the light source unit 220 will be described with reference to FIG. 3.

Figure 3:
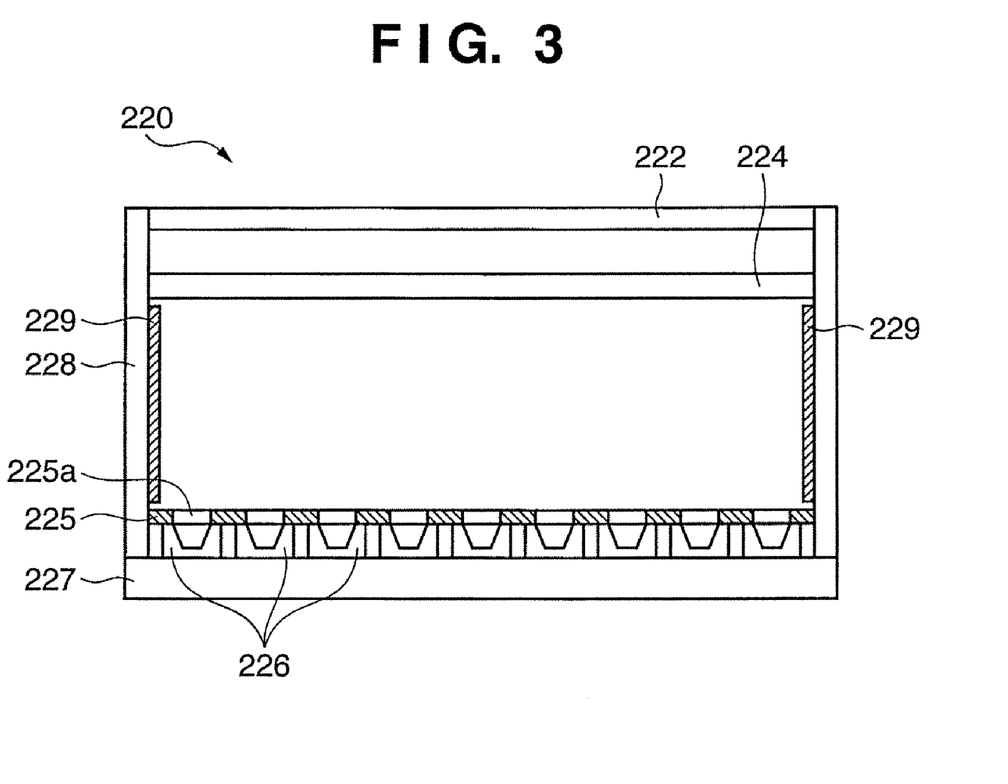
FIG. 3 is a sectional view of a light source unit according to the first embodiment of the present invention.

FIG. 3 is a sectional view of the light source unit according to the first embodiment of the present invention.

In the light source unit 220, a light-emitting portion, obtained by two-dimensionally arranging a plurality of or at least one LED 226 serving as a surface mounted dot-like light source, is arranged on a substrate 227. A diffusion plate 224 is arranged at that portion in the light source unit 220 which opposes the exit surfaces of the LEDs 226.

Reference numeral 228 denotes a housing which constitutes the side surface of the light source unit 220. A reflection sheet 225 serving as a reflection member is arranged between the substrate 227 and diffusion plate 224. The reflection sheet 225 is in contact with the light-emitting surfaces of the respective LEDs 226 to cover their portions other than the light-emitting surfaces.

The reflection sheet 225 has openings 225a through which the beams emerging from the LEDs 226 can pass. The reflection sheet 225 is formed of a film-like thin member and fixes to the upper end faces of the LEDs 226 by adhering an adhesive such as a double-sided tape to its one surface. A polarizing selection element 222, which transmits a linear polarized beam in a predetermined polarizing direction and reflects light in other polarizing directions, is arranged outside the diffusion plate 224 of the light source unit 220.

The optical function of the light source unit 220 will be described in detail.

In the initial state, the beam emerging from each LED 226 is not polarized. The diffusion plate 224 diffuses the non-polarized beam to enter the polarizing selection element 222. The polarizing selection element 222 transmits therethrough light linearly polarized in a direction necessary to illuminate the liquid crystal panel 202. The transmitted light is used to illuminate the liquid crystal panel 202. The polarizing selection element 222 reflects beams in other polarizing directions so as to be transmitted through the diffusion plate 224 again, so their polarizing directions change randomly.

The reflection sheet 225 reflects the beams that are polarized in randomly changing polarizing directions, so the beams enter the polarizing selection element 222 again through the diffusion plate 224. At this time, the polarizing selection element 222 transmit therethrough the polarized beams necessary to illuminate the liquid crystal panel 202, and reflects the remaining polarized beams again. The diffusion plate 224 diffuses the reflected polarized beams again in random polarizing directions.

This optical operation is repeated so most of the beams emerging from the respective LEDs 226 are transmitted through the polarizing selection element 222 and used to illuminate the liquid crystal panel 202.

By using the polarizing selection element 222 as in the light source unit 220 shown in the first embodiment, most of the beams emitted by the respective LEDs 226 can be utilized to illuminate the liquid crystal panel 202. This can decrease the light quantity loss when compared to a case that uses only a polarizing plate.

The arrangement of an LED 226 alone mounted on the substrate 227 will be described with reference to FIG. 4.

Figure 4:
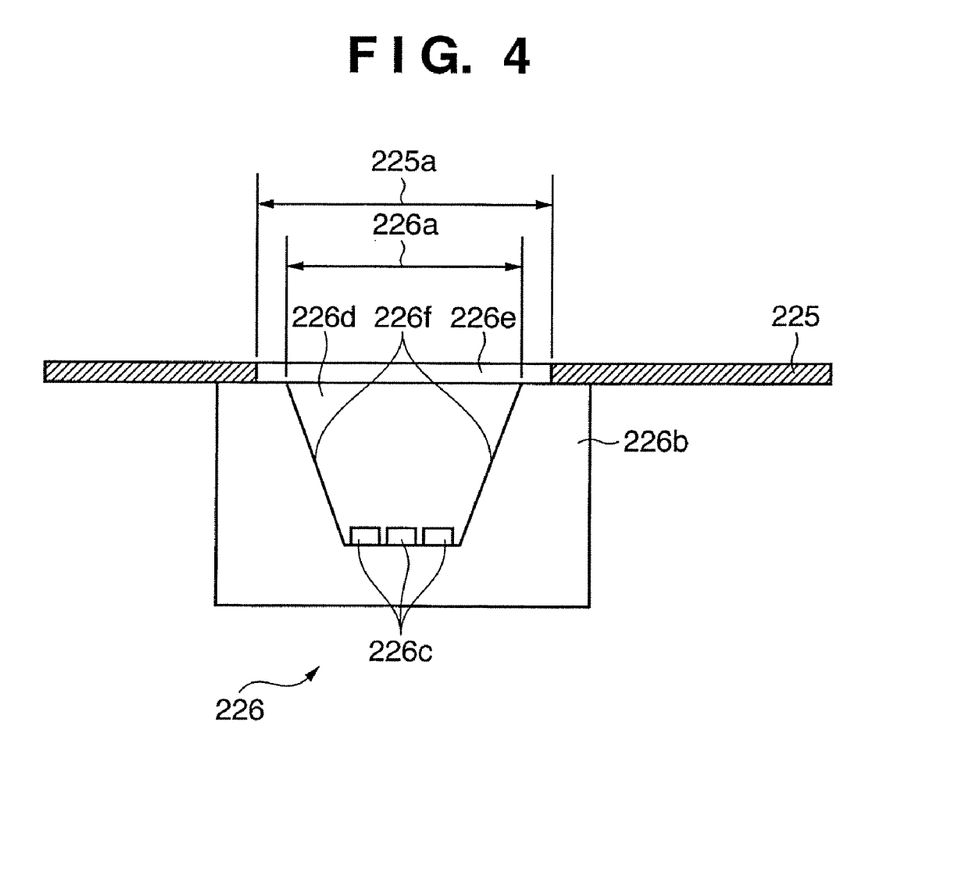
FIG. 4 is a sectional view of one LED and a reflection sheet in its vicinity according to the first embodiment of the present invention.

FIG. 4 is a sectional view of one LED and a reflection sheet in its vicinity according to the first embodiment of the present invention.

The LED 226 comprises a package 226b serving as a housing, light-emitting portions 226c which emit R, G, and B light, and a transparent sealing resin portion 226d which seals the light-emitting portions 226c.

A light-emitting surface 226e at the upper end of the package 226b has an optical opening 226a for beams emitted by the light-emitting portions 226c. A taper surface 226f having a shape that conforms to the beams emitted from the light-emitting portions 226c is formed between the optical opening 226a and light-emitting portions 226c. In other words, the taper surface 226f is formed to surround the light-emitting surface 226e of the light-emitting portions 226c.

The reflection sheet 225 has the opening 225a with a shape larger than the size of the end portion of the taper surface 226f of the optical opening 226a and smaller than the size of the end face of the package 226b.

This shape can prevent the beams emitted from the light-emitting portions 226c from being shielded by the reflection sheet 225, and decreasing the reflection efficiency when reflecting again the beams reflected by the polarizing selection element 222.

Figure 5A:
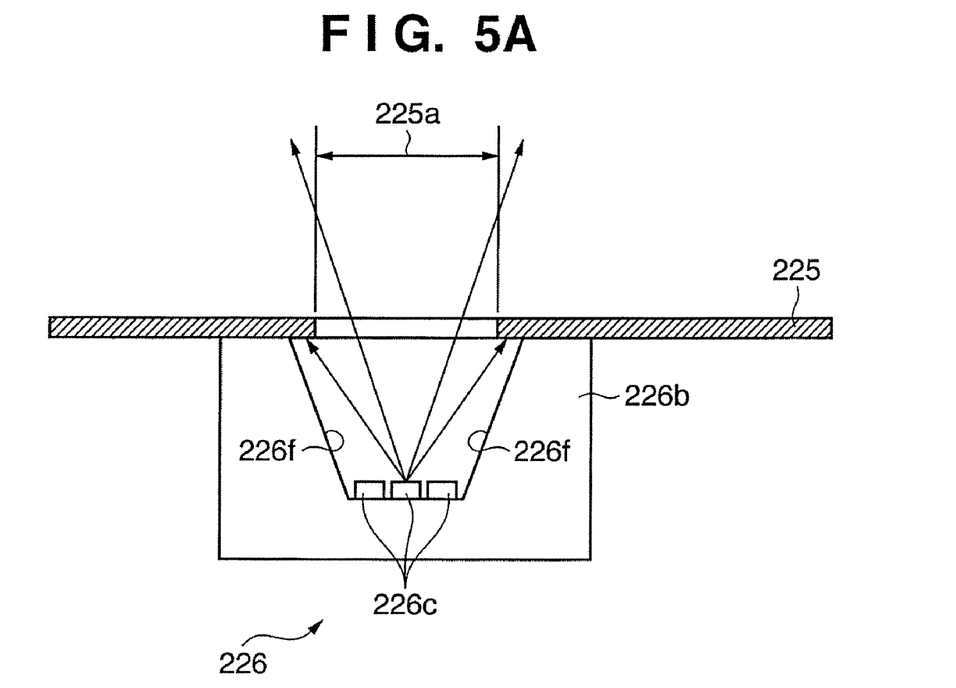
FIG. 5A is a view explaining the reflection efficiency of the first embodiment of the present invention.

For example, as shown in FIG. 5A, if the opening 225a of the reflection sheet 225 is smaller than the taper surface 226f of the LED 226, the beams emitted from the light-emitting portions 226c partly hit the lower surface of the reflection sheet 225 undesirably to decrease the light quantity of emerging beams.

Figure 5B:
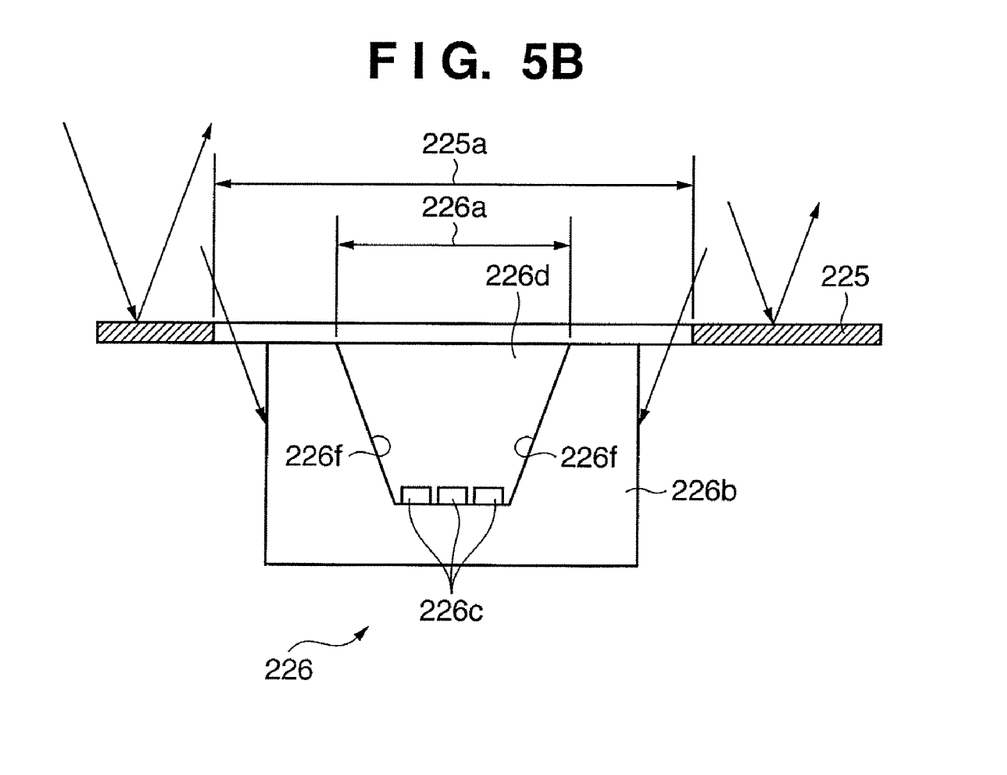
FIG. 5B is a view explaining the reflection efficiency of the first embodiment of the present invention.

As shown in FIG. 5B, if the opening 225a of the reflection sheet 225 is larger than the outer shape of the package 226b, the reflection area decreases to decrease the reflection efficiency.

Furthermore, the randomly polarized beams reflected by the polarizing selection element 222 hit the side surface of the package 226b undesirably and are absorbed by the package 226b to further decrease the reflection efficiency.

Hence, in terms of the reflection efficiency, preferably, the shape of the opening 225a formed in the reflection sheet 225 is larger than the end portion of the taper surface 226f and smaller than the package 226b.

If a reflection sheet 229 is formed on the side surface of the light source unit 220 as well, it can return the beams hitting the side surfaces of the packages 226b to the reflection sheet 225 formed on the LEDs 226. This can further increase the reflection efficiency.

As described above, according to the first embodiment, in the light source device which is used to illuminate the video display elements such as liquid crystal elements, most of the beams emitted from illumination elements such as LEDs can be utilized. Consequently, a light source device having a small light quantity loss can be provided.

More specifically, by arranging the reflection sheet to implement the arrangement as shown in FIG. 3, most of the illumination beams emitted from the light-emitting elements (LEDs 226) can be utilized for illumination. Thus, a light source device having a small light quantity loss can be provided.

The first embodiment is merely an example, and various modifications can naturally be made within the scope of the appended claims.

Second Embodiment

The second embodiment of the present invention will be described in detail with reference to FIG. 6. The same portions as in the first embodiment are denoted by the same reference numerals, and a description thereof will be omitted.

Figure 6:
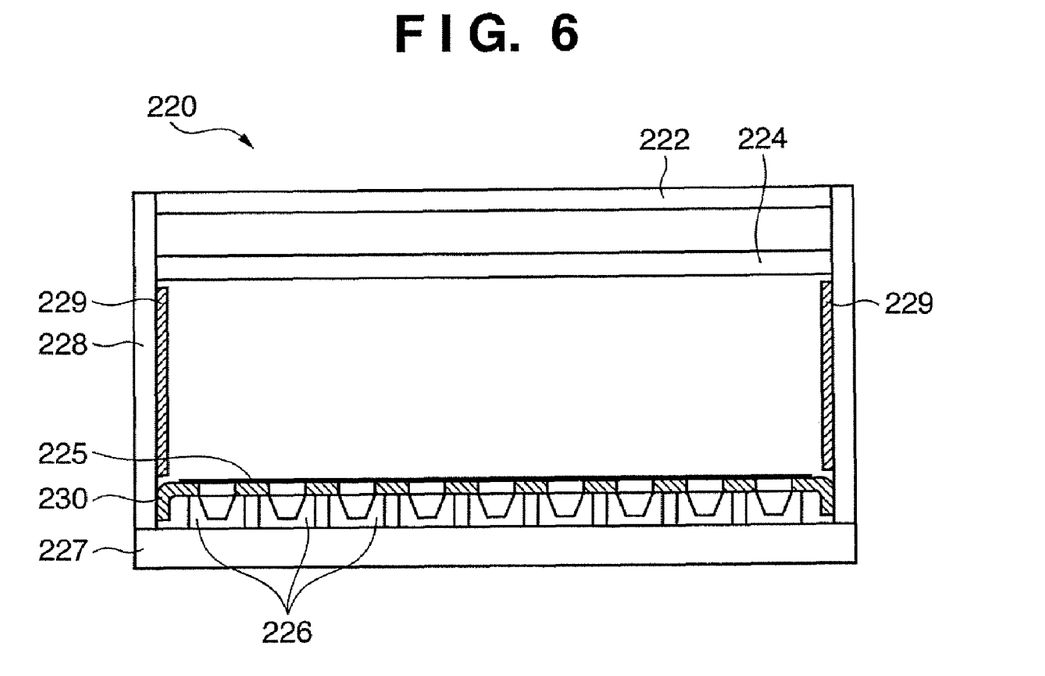
FIG. 6 is a sectional view of a light source unit according to the second embodiment of the present invention.

FIG. 6 is a sectional view of a light source unit according to the second embodiment of the present invention.

Each LED 226 emits light when a current is supplied to it. The flowing current is not entirely converted into energy for light emission but is partly converted into heat. Thus, when supplying the current, the element temperature of the LED 226 increases.

Generally, when the temperature of an electrical component increases, the internal resistance of the electrical component increases, and the energy conversion efficiency of the electrical component decreases. In the LED 226, a temperature increase decreases the quantity of emitted light.

To prevent a decrease in light emission efficiency of the LED 226, the heat generated by the LED 226 must be dissipated to the outside to maintain the element temperature low.

In view of this, according to the second embodiment, a reflection member 230 made of a metal, e.g., copper or aluminum, having high thermal conductivity is arranged between a substrate 227 and diffusion plate 224. A reflection sheet 225 adheres to the reflection surface of the reflection member 230. The opposite surface of the reflection member 230 is in contact with the light-emitting surfaces of the respective LEDs 226 to cover their portions other than the light-emitting surfaces.

The two ends of the reflection member 230 are bent toward the substrate 227, as shown in FIG. 6, to come into contact with a housing 228. The housing 228 is formed of an aluminum material.

With this arrangement, heat generated by light emission of the LEDs 226 is conducted to the reflection member 230, transferred from the reflection member 230 to the housing 228, and dissipated to the outer air.

Regarding the material of the housing 228, a copper material is better than an aluminum material in terms of thermal conductivity. As the copper material has a large specific gravity, however, the resultant housing 228 becomes heavy. Therefore, it is preferable to employ the aluminum material.

This arrangement enables effective dissipation of heat generated by light emission of the LEDs 226, and can prevent a decrease in light emission efficiency caused by the temperature increase of the LEDs 226.

The second embodiment discloses an example of the reflection member 230 formed by adhering the reflection sheet 225 to a metal plate. However, the present invention is not limited to this. If the metal plate is polished, its reflectance increases to be equal to or higher than a specified value. Such a polished metal plate may be directly used as the reflection member 230.

This arrangement can eliminate the reflection sheet 225 to enable cost reduction.

The material of the housing 228 is not limited to an aluminum material. By using a material having high thermal conductivity, the same effect can naturally be obtained.

As described above, according to the second embodiment, in addition to the effect described in the first embodiment, the reflection member is made of a metal and brought into contact with a housing portion. This allows heat generated by the LEDs to be dissipated effectively. This can prevent a decrease in light emission efficiency which is caused by the temperature increase of the light emitting elements.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-122530 filed on Apr. 26, 2006, which is hereby incorporated by reference herein in its entirety.

What is claimed is:

1. A light source device to illuminate a display element, comprising:
   a plurality of dot-like light sources;
   a substrate where said dot-like light sources are arranged; and
   a reflection member which is arranged to be in contact with a light-emitting surface of said dot-like light sources and to cover a region surrounding said dot-like light sources, said reflection member including an opening to pass therethrough a beam emitted from said dot-like light sources,
   wherein a taper surface is formed to surround said light-emitting surface of said dot-like light sources, and
   wherein said opening is smaller than a size of an end face of a housing of said dot-like light sources.

2. The device according to claim 1, wherein
   said opening is larger than an end portion of said taper surface.

3. The device according to claim 1, wherein said reflection member comprises one of a member made of a metal and a member obtained by attaching a reflection plate to a metal.

4. The device according to claim 1, wherein
   said housing of said dot-like light sources includes a side surface that surrounds said substrate where said dot-like light sources are arranged, and
   said reflection member is arranged to be in contact with said side surface.

5. A display apparatus which processes an input signal and displays an image to an observer, comprising:
   display means;
   a plurality of dot-like light sources to illuminate the image displayed on said display means;
   a substrate where said dot-like light sources are arranged; and
   reflecting means which is arranged to be in contact with a light-emitting surface of said dot-like light sources and to cover a region surrounding said dot-like sources, said reflection means including an opening to pass therethrough a beam emitted from said dot-like light sources.

6. The apparatus according to claim 5, wherein
   a taper surface is formed to surround said light-emitting surface of said dot-like light sources, and
   said opening is larger than an end portion of said taper surface.

7. The apparatus according to claim 5, wherein
   a taper surface is formed to surround said light-emitting surface of said dot-like light sources, and
   said opening is smaller than a size of an end face of a housing of said dot-like light sources.

8. The apparatus according to claim 5, wherein said reflection member comprises one of a member made of a metal and a member obtained by attaching a reflection plate to a metal.

9. The apparatus according to claim 7, wherein
   said housing of said dot-like light sources includes a side surface that surrounds said substrate where said dot-like light sources are arranged, and
   said reflection means is arranged to be in contact with said side surface.

* * * * *